F. Wicks.
Hay Fork.
No. 44,760. Patented Oct. 18, 1864.
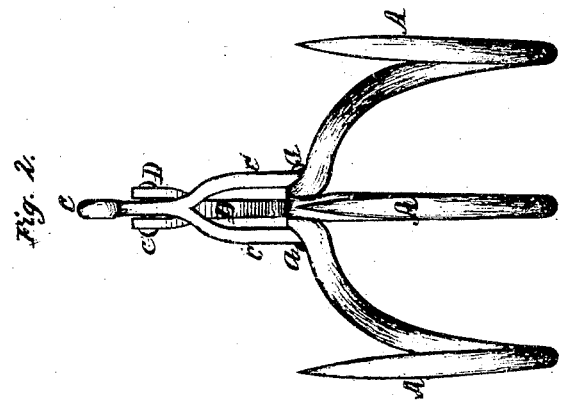
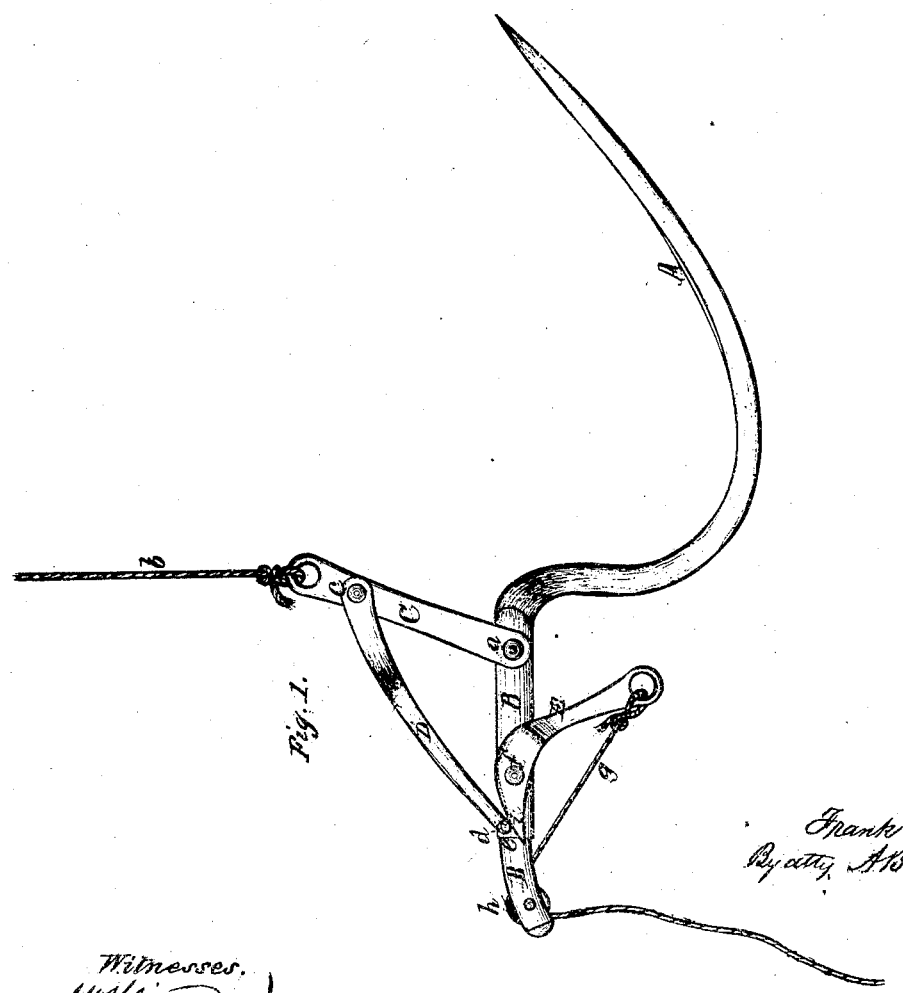
Frank Wicks.
By atty. A.B. Stoughton.
Witnesses.

UNITED STATES PATENT OFFICE.

FRANK WICKS, OF KANSAS, ILLINOIS.

IMPROVEMENT IN HORSE HAY-FORKS.

Specification forming part of Letters Patent No. 44,760, dated October 18, 1864.

*To all whom it may concern:*

Be it known that I, FRANK WICKS, of Kansas, in the county of Edgar and State of Illinois, have invented certain new and useful Improvements in Forks for Elevating Hay, &c., onto Stacks or into Mows or Barns; and I do hereby declare that the following is a full, clear, and exact description of the same, reference being had to the accompanying drawings, making a part of this specification, in which—

Figure 1 represents a side view of the fork with its ropes for elevating and tripping attached. Fig. 2 represents a front view thereof.

Similar letters of reference, where they occur in the separate figures, denote like parts of the fork in both of the drawings.

Many of these hay-forks have been devised for holding in a horizontal position the load upon its tines while being elevated, and so made as to trip and fall by the overweight on the tines, and thus deliver the load on the stack or in the mow; but while the trigger or dog may be successfully drawn out of its notch or catch the tines will not always drop, because the brace or other part which holds the tines will not with certainty leave its support and the overpoise will not always act with certainty.

My invention consists in so combining the trigger and brace as that when the trigger is drawn from its catch it will positively push the brace out of its catch or support, and thus leave nothing to resist the overweight of the tines or of the load, leaving nothing to contingencies, but making the trip a positive thing by forcing the brace out of its seat.

To enable others skilled in the art to make and use my invention, I will proceed to describe the same with reference to the drawings.

A represents the tines, of any suitable number and of the proper curve to enter and hold upon them the hay or other thing to be elevated. These tines may unite and form a common shank, B, to which the several raising and tripping devices are attached, or they may unite with a common bar, to which the shank and its appliances may be fastened. On the shank B, near where the tines unite with it, as at *a*, there is pivoted a link, C, to the upper end of which the hoisting-rope *b* is attached, and to this link, as at *c*, is pivoted a brace, D, the end *d* of which may be forked or spread out, so as to leave a bearing thereon to rest in the notch or recess *e* in the top of the shank, and the spread-out portions to extend slightly beyond the sides of the shank.

E is a trigger pivoted to the shank, as at *f*, its tail or lower end having the cord *g* fastened to it, by which it is tripped. The trigger is forked, and its jaws are curved and tapered off, as at *i*, so as to take under the projecting ends *d* of the brace. The cord *g* passes from the end of the trigger over a pulley, *h*, in the end of the shank, and thence down where the operator stands, so as to be conveniently reached by him.

When the fork has upon it its load of hay or other thing to be elevated it hangs to the hoisting-rope in a position like that shown in Fig. 1. When its load is to be discharged or dropped the operator pulls the cord *g*, which forces up the jaws *i* of the trigger against the projecting ends *d* of the brace and forces said ends or the end of said brace out of its recess, when the tines will drop and discharge their load. It will be perceived that the trigger is not simply drawn away, so that the overweight on the tines will cause the brace to slip out or admit of a tipping motion if nothing else should prevent it, but it actually forces it out of its seat and leaves nothing contingent upon the overweight. The end of the brace D may have a roller fixed in it, and a set-screw may be put into the shank so as to regulate the trip motion.

Having thus fully described my invention, what I claim therein as new, and desire to secure by Letters Patent, is—

The combination and pivoted or hinged connection of the trigger E with the brace D, link C, and shank B, so that drawing upon the cord *g* will throw the brace out of its notch or recess, removing all contact or friction between it and the other parts of the fork, and thus allow the tines to drop and discharge their load, substantially as herein described and represented.

FRANK WICKS.

Witnesses:
 WASHINGTON STEPLETON,
 JAMES BARRETT.